United States Patent [19]

Suzuki

[11] Patent Number: 5,259,414
[45] Date of Patent: Nov. 9, 1993

[54] PRESSURE CONTROL VALVE

[75] Inventor: Akira Suzuki, Aichi, Japan

[73] Assignee: Aisin AW Co., Ltd, Japan

[21] Appl. No.: 430,412

[22] Filed: Nov. 2, 1989

[30] Foreign Application Priority Data

Nov. 9, 1988 [JP] Japan .................. 63-281415
Nov. 9, 1988 [JP] Japan .................. 63-281416

[51] Int. Cl.$^5$ .................. F15B 13/044; F16K 31/06
[52] U.S. Cl. .......................... 137/625.65; 251/129.16
[58] Field of Search ............... 137/625.65; 251/129.16

[56] References Cited

U.S. PATENT DOCUMENTS

| | | |
|---|---|---|
| 2,858,487 | 10/1958 | Immel . |
| 3,880,476 | 4/1975 | Belart et al. . |
| 4,250,922 | 2/1981 | Will et al. . |
| 4,316,599 | 2/1982 | Bouvet et al. . |
| 4,535,816 | 8/1985 | Feder et al. . |
| 4,579,145 | 4/1986 | Leiber et al. . |
| 4,605,197 | 8/1986 | Casey et al. ........... 251/30.01 |
| 4,635,683 | 1/1987 | Nielsen . |
| 4,662,605 | 5/1987 | Garcia . |
| 4,838,313 | 6/1989 | Kobayashi et al. ...... 137/625.65 |
| 4,838,517 | 6/1989 | Miki et al. ............ 137/625.65 |
| 4,838,518 | 6/1989 | Kobayashi et al. ...... 137/625.65 |

FOREIGN PATENT DOCUMENTS

| | | |
|---|---|---|
| 2255272 | 11/1972 | Fed. Rep. of Germany . |
| 3402119 | 7/1985 | Fed. Rep. of Germany ........ 137/625.65 |
| 60-52509 | 4/1985 | Japan . |
| 62-298414 | 12/1988 | Japan . |
| 63-298415 | 12/1988 | Japan . |
| 63-298416 | 12/1988 | Japan . |
| 63-298417 | 12/1988 | Japan . |
| 1117872 | 3/1983 | United Kingdom . |

Primary Examiner—Gerald A. Michalsky
Attorney, Agent, or Firm—Lorusso & Loud

[57] ABSTRACT

The disclosed pressure control valve includes a valve sleeve, a spool valve slidably mounted in the valve sleeve, an electromagnet including a core having a flange portion formed at one end, a push rod, a coil assembly, and a case. A tapered portion is formed on an end surface of at least one of a flange formed on the valve sleeve or the flange portion of the core. Since only the peripheries of the flange portions contact, concentricity of the spool valve and the push rod can be readily obtained at the time of assembling the valve sleeve and the core. The case has an annular recess formed on its inner surface for receiving a part of the electromagnet, for example the coil assembly or the flange portion of the core. An end portion of the case is locked into an annular stepped portion formed on the flange portion of the valve sleeve. Therefore, the length of the assembled electromagnet portion can be shortened by the depth of the annular step. A ring made of unwoven fabric is interposed between the flange portion of the core and the coil assembly to prevent looseness and to remove foreign matter from the hydraulic oil.

10 Claims, 3 Drawing Sheets

PRESSURE CONTROL VALVE

BACKGROUND OF THE INVENTION

The present invention relates to a pressure control valve, and, more particularly, to an electromagnetic pressure control valve capable of controlling fluid pressure in response to an electric signal.

Pressure control valves are represented by a diaphragm type pressure control valve wherein the surface of the diaphragm of receives feedback pressure and a spool type pressure control valve wherein the end surface of the spool receives feedback pressure. The present invention relates to an electromagnetic pressure-control valve of the spool type.

The spool type electromagnetic pressure-control valve is usually designed in such a manner that a load caused by the electromagnet, a spring load, and an output pressure feedback load are arranged to act on a spool valve which slides in a valve sleeve having a supply port, an output pot, and an exhaust port. Its structure is arranged such that the supply pressure to be outputted is controlled to a level which corresponds to the electric signal supplied to the electromagnet portion by arranging the balance among the above-described loads (see Japanese Patent Laid-Open No. 60-52509).

In the conventional pressure control valves of the type described above, when a pressure governing valve portion comprising a valve sleeve and a spool valve capable of sliding in the valve sleeve and an electromagnet portion comprising a coil assembly, a core, and a plunger are assembled, a flange portion of the valve sleeve and a case covering the electromagnet portion are brought into contact with each other before staking an end portion of the case in such a manner that the contact portion is covered.

However, it is necessary for the flange portion of the valve sleeve and the end portion of the case to be flattened in order to stake the end portion of the case. If a satisfactory flatness cannot be obtained in the two end surfaces, the spool valve accommodated in the valve sleeve and a push rod accommodated in the case via a core lose their concentricity. This leads to a problem in that the operation of the electromagnet portion cannot accurately be transmitted to the spool valve. As a result, the response of the pressure control valve deteriorates or sticking or slippage is caused during the operation of the pressure control valve.

An alternative might therefore be considered of employing a method in order to keep the concentricity between the spool valve and the push rod, the method being arranged so that the plunger is disposed on the other side to the valve sleeve and a flange portion is formed on the core so that the flange portion thus formed and the flange portion formed on the valve sleeve are brought into contact with each other. However, in this case also, the two flange portions may not have sufficiently flat mating surfaces.

Furthermore, it is necessary for the entire surface of the end portion of the flange portions on the valve sleeve and the core respectively taken from casting molds to be subjected to cutting work. As a result, manufacturing cannot be conducted efficiently, and the cost rises excessively.

In the case where the pressure control valve is included in a hydraulic pressure control circuit for use in an automatic transmission, hydraulic oil for operating an oil tank is supplied to the pressure governing valve portion so as to operate the pressure control valve. The electromagnet portion of the pressure control valve is filled with hydraulic oil for the purpose of preventing hydraulic pressure vibrations caused at high temperature. As a result, hydraulic oil for operating the pressure governing valve portion is arranged to be supplied to the electromagnet portion of the pressure control valve.

When hydraulic oil in the oil tank is supplied to the electromagnet portion of the above-described conventional pressure control valve, foreign matter such as iron dust formed in the other bulbs or the like can enter the electromagnet portion together with hydraulic oil.

Such foreign matter adheres to the surface of a plunger since the plunger is magnetized as a result of the supply of an electric signal to the electromagnet portion. The foreign matter accumulated in accordance with the passage of time causes sticking of the plunger or a short circuit of the magnetic circuit. If such foreign matter enters between a push rod for securing the plunger and a liner type rolling bearing, the liner type rolling bearing can be seized by the foreign matter thus caught.

In order to prevent the invasion of such foreign matter into the electromagnet portion, an O ring or the like is disposed between the coil assembly and the case.

However, in the above-described structure arranged such that an O ring or the like is disposed between the coil assembly and the case, a space in which the O ring can be accommodated becomes necessary. Therefore, a recessed portion is formed at the required portion, and finishing is required for the purpose of improving the sealing effect.

SUMMARY OF THE INVENTION

An object of the present invention is to provide a pressure control valve capable of overcoming the above-described problems experienced with the conventional pressure control vales, thus assuring that a spool valve accommodated in a valve sleeve and a push rod accommodated in a core of an electromagnet can be disposed concentrically within a simple structure.

A first object of the present invention is to provide a pressure control valve designed to prevent invasion of foreign matter into the electromagnet portion and to allow ready assembly of a coil.

In order to achieve the above-described objects, the present invention provides a pressure control valve including a valve sleeve having a supply port, an output port, and an exhaust port, and further having a flange portion formed in an end portion thereof; and a spool valve capable of sliding in the valve sleeve and receiving a load caused by an electromagnet, a spring load, and an output pressure feedback load.

The pressure control valve according to the present invention further comprises: a push rod capable of moving together with the spool valve; a core surrounding the push rod, capable of slidably supporting the push rod, and having a flange portion formed in an end portion thereof; a coil assembly disposed on an outer surface of the core; and a case formed on an outer surface of the coil assembly.

The spool valve receives the output pressure feedback load in the same direction as that of the spring load, or receives the output pressure feedback load in the same direction as that of the load caused by the electromagnet.

A tapered portion in the form of a recess shape is formed from a periphery toward the central portion, the tapered portion being disposed on at least an end surface of the flange portion formed on the valve sleeve and the flange portion formed on the core.

The case has a stepped portion formed on an inner surface thereof so that an end portion of the case is staked by bringing a part of an electromagnet into contact with the stepped portion. The part of the electromagnet is the coil assembly or the flange portion of the core.

A ring made of unwoven fabric is interposed between ends of the flange portion of the core and the coil assembly.

The flange portion of the valve sleeve has an annular stepped portion on its end surface confronting the core, and an end of the case with the annular stepped portion.

According to the present invention, since the tapered portion is formed at least an end surface of the flange portion of the valve sleeve and that of the flange portion of the core of the electromagnet portion, the two flanges are brought into contact with each other only at their peripheries. Therefore, concentrically can be readily obtained, and the two peripheries can be easily worked to flatten same.

Furthermore, since the flange portion of the valve sleeve has an annular stepped portion on its end surface confronting the core, and the pressure governing portion and the electromagnet portion can be coupled to each other by staking the end portion of the case with the annular stepped portion, the length of the assembled electromagnet portion can be shortened.

Since the stepped portion presses the end portion of the coil assembly after the pressure control valve has been assembled, the ring made of unwoven fabric can be compressed by the end portion of the flange portion of the core and the same of the coil assembly.

Therefore, looseness caused between the coil assembly and the core can be prevented. In addition, since the unwoven fabric ring serves as a filter capable of removing foreign matter in hydraulic oil, a necessity of providing an individual filter can be eliminated.

BRIEF DESCRIPTION OF DRAWINGS

The structure and features of the pressure control valve according to the invention will be seen by reference to the following drawings in which.

DESCRIPTION OF PREFERRED EMBODIMENT

Figure 1:
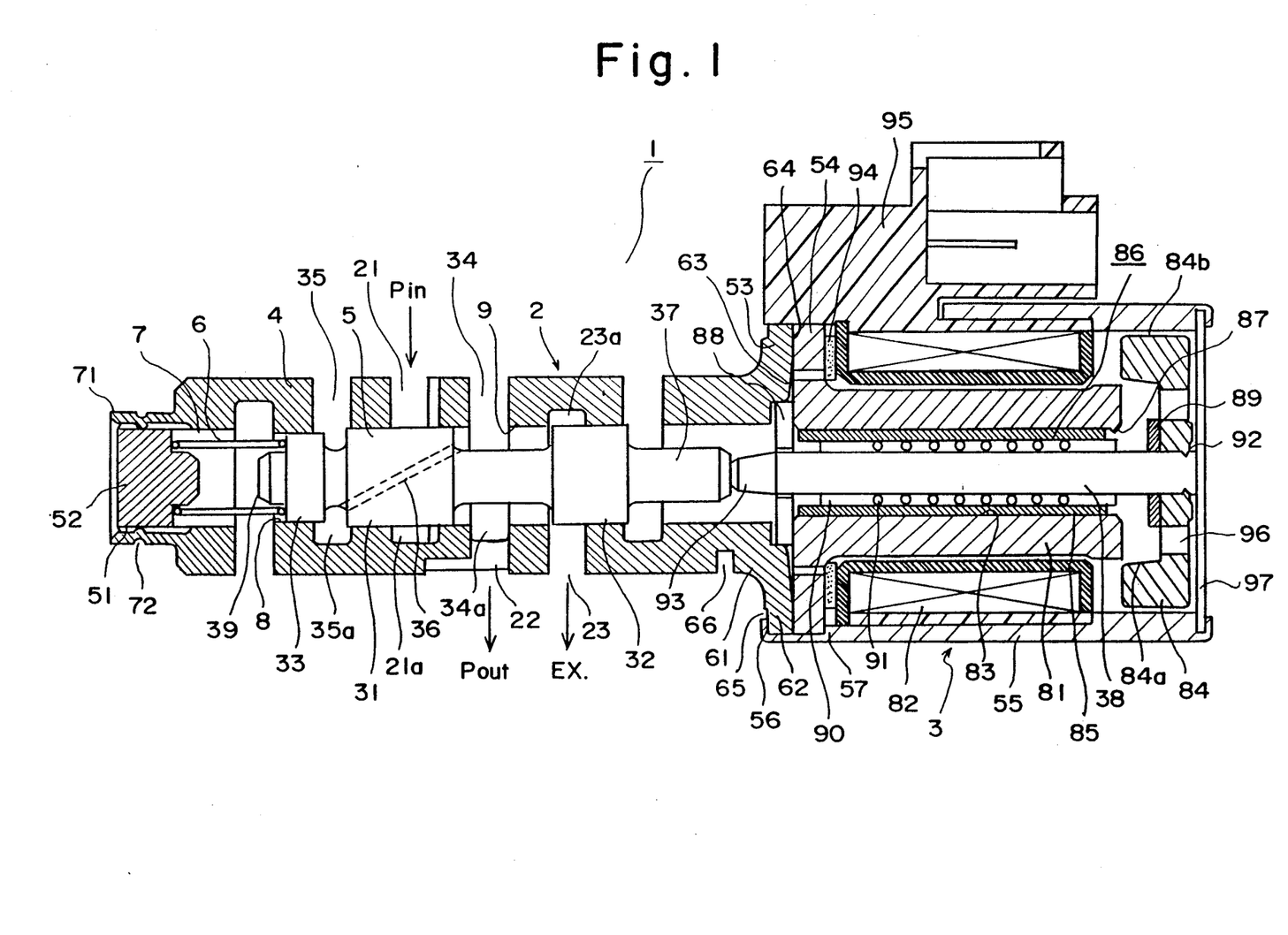
FIG. 1 is a cross sectional view which illustrates a first embodiment of a pressure control valve according to the present invention.

FIG. 1 is a cross sectional view which illustrates a first embodiment of a pressure control valve according to the present invention.

Referring to FIG. 1, a pressure control valve 1 comprises a pressure governing valve portion 2 and an electromagnet portion 3. The pressure governing valve portion 2 comprises a valve sleeve 4 and a spool valve 5. A large-diameter hole 7 accommodating a spring 6, and, next to it, a small-diameter guide hole 8 and an intermediate-diameter guide hole 9 for guiding the spool valve 5 are formed in the valve sleeve 4 in its axial direction in the form of through holes.

A radially extending supply port 21, an exhaust port 23, and an output port 22 are successively formed in the sequential order described above from left to right when viewed in the drawing upon the outer surface of the valve sleeve 4 at a position which corresponds to the above-described guide hole 9. In order to make the flow of oil smooth at each of the ports, annular cutout portions 21a, 23a, 34a, and 35a are, if necessary, formed.

The spool valve 5 has two land portions 31 and 32 having the same diameter and are intimately guided by being slid into the above described intermediate-diameter guide hole 9, the spool valve 5 further having a small-diameter land portion 33 formed next to the land portion 31 and is intimately guided into the small-diameter guide hole 8 by being slid. The distance between the two land portions 31 and 32 having the same diameter is determined so as to enable the output port 22 to alternately communicate with the supply port 21 and the exhaust port 23 at a predetermined ratio when the spool valve 5 slides. A space 34 formed between the land portions 31 and 32 having the same diameter is always connected to the output port 22.

A closed space 35 formed by the land portion 31, the small-diameter land portion 33, and guide holes 8 and 9 is connected to the space 34 formed between the land portions 31 and 32 by a feedback oil passage 36. The feedback oil passage 36 passes diagonally through the land portion 31 so that output pressure obtained at the output port 22 is fed back to the closed space 35.

A column portion 37 projecting over the central portion of the end surface of the same-diameter land portion 32 is arranged to be brought into contact with a push rod 38 of the electromagnet portion 3 to be described later, while a guide member 39 projecting over the central portion of the end surface of the small-diameter land portion 33 guides the above-described spring 6.

In order to apply a load to the spring 6, the hole 7 formed through the valve sleeve 4 has a female screw member 51 formed thereon, and a male screw member 52 which is adapted to be screwed with the female screw member 51 is inserted therein. As a result, the spring 6 can be abutted against the end surface of the spool valve 5 by introducing the male screw member 52 into the hole 7 with being rotated. Therefore, the compression degree of the spring 6 can be varied by adjusting the angular degree of the rotation of the male screw member 52.

When the pressure governing valve 2 is assembled, first the spool valve 5 is inserted into the hole 8 formed in the valve sleeve 4 with the small-diameter land portion 33 positioned at an end portion of the hole 8. On the other hand, the spring 6 is inserted from the hole 7 so as to surround the guide member 39 and to come contact with the end surface of the small-diameter land portion 33. Thus, the spring 6 is compressed by a predetermined degree by screwing the male screw member 52 into the female screw member 51 formed in the valve sleeve 4 under condition that the spring 6 is retained.

The pressure governing valve portion 2 thus assembled can be coupled with the electromagnet portion 3 by causing a flange portion 53 formed at an end portion of the valve sleeve 4 adjacent to the hole 7 to confront a flange portion 54 of the electromagnet 3, and by staking an end portion 56 of a case 55. In order to easily staking the end portion 56 of the case 55, a stepped portion 57 is formed on the inner surface of the case 55 at a position confronting the flange portion 54. Thus, the staking is conducted with the flange portion 54 positioned on the shoulder portion of the stepped portion 57.

The flange portion 53 is constituted by a thick wall portion 61 and a thin wall portion 62, the thick wall portion 61 having a tapered portion 63 at its end surface. The tapered portion 63 is provided for the purpose of forming a recessed portion acting when the flange portion 53 is caused to confront the flange portion 54. That is, the two flange portions 53 and 54 are caused to come contact with each other at only a periphery portion 64 by virtue of the recessed portion thus formed. Therefore, only the periphery portion 64 needs to be subjected to a surface working when the two flange portions 53 and 54 are brought into contact with each other. This enables the assembling work to be conducted easily, and realizes a satisfactory state of the assembly.

On the other hand, the periphery portion of the above-described thin wall portion 62 has an annularly stepped portion 65. The annularly stepped portion 65 is provided for the purpose of shortening the length of the assembled pressure control valve 1. That is, since the pressure control valve 1 involves a limitation in terms of its location, it must be shortened within the limits of possibility. Therefore, it is preferable that the thickness of each of the flange portions 53 and 54 be reduced. However, it is very difficult for the thickness of each of the two flange portions 54 and 54 to be reduced since their strength is weaken. In order to overcome the problem above, the thick wall portion 61 is arranged to have a constant thickness and the above-described annularly stepped portion 65 is formed in the thin wall portion 62 which is formed next to the thick wall portion 61. As a result, the length of the completed electromagnet portion 3 can be shortened by a degree corresponding to the size of the annular stepped portion 65.

A cutout 66 is provided for the purpose of aligning between the supply port 21, the exhaust port 23, the output port 22 formed on the outer surface of the valve sleeve 4 in a radial direction and, for example, a hydraulic pressure control system for an automobile (omitted from illustration).

After the pressure governing valve portion 2 and the electromagnet portion 3 have been coupled to each other, the above-described male screw member 52 is rotated so as to be moved in the female screw member 51. As a result, the degree of compression of the spring 6 is adjusted with an electric current supplied to the electromagnet 3 and with pressure outputted from the output port 22 supervised. After the adjustment has been completed, a projecting portion 71 in which the female screw member 51 is formed is staked from outside as designated by reference numeral 72 in FIG. 72 so that the male screw member 52 is fixed. In order to easily conduct the staking work, a portion of the above-described projecting portion 71 is formed to be a thin wall portion.

Then, the electromagnet portion 3 will be described.

The electromagnet portion 3 comprises the cylindrical case 55 made of a magnetic material, the case 55 accommodating a cylindrical thick wall core 81 similarly made of the magnetic material. The core 81 is disposed in such a manner that the flange portion 54 formed at an end portion thereof comes contact with and thereby engaged to the flange portion 53 of the above-described valve sleeve 4. In the inner part of a cylindrical space formed by the case 55 and the core 81 there is provided a coil assembly 82 secured therein. Thus, a stationary portion is constituted by the cylindrical case 55, the core 81, and the coil assembly 82.

On the other hand, a movable portion is constituted by the push rod 38 inserted into a hollow portion 83 of the core 81 and a plunger 84 similarly made of the magnetic material and secured to another end portion of the push rod 38, the plunger 84 being arranged to be attracted by the coil assembly 82.

The plunger 84 secured to another end portion of the push rod 38, that is, on the side which is away from the pressure governing valve portion 2 is formed in a thick annular shape. The plunger 84 has a cylindrical recessed portion 84a formed at its central portion on its side confronting the core 81. The recessed portion 84a can receive an end portion of the core 81 with a small clearance kept therefrom when the plunger 84 is attracted as described above. Furthermore, an outer surface 84b of the plunger 84 is arranged to confront the inner surface of the above-described case 55 with a small clearance kept therefrom similarly.

Figure 2:
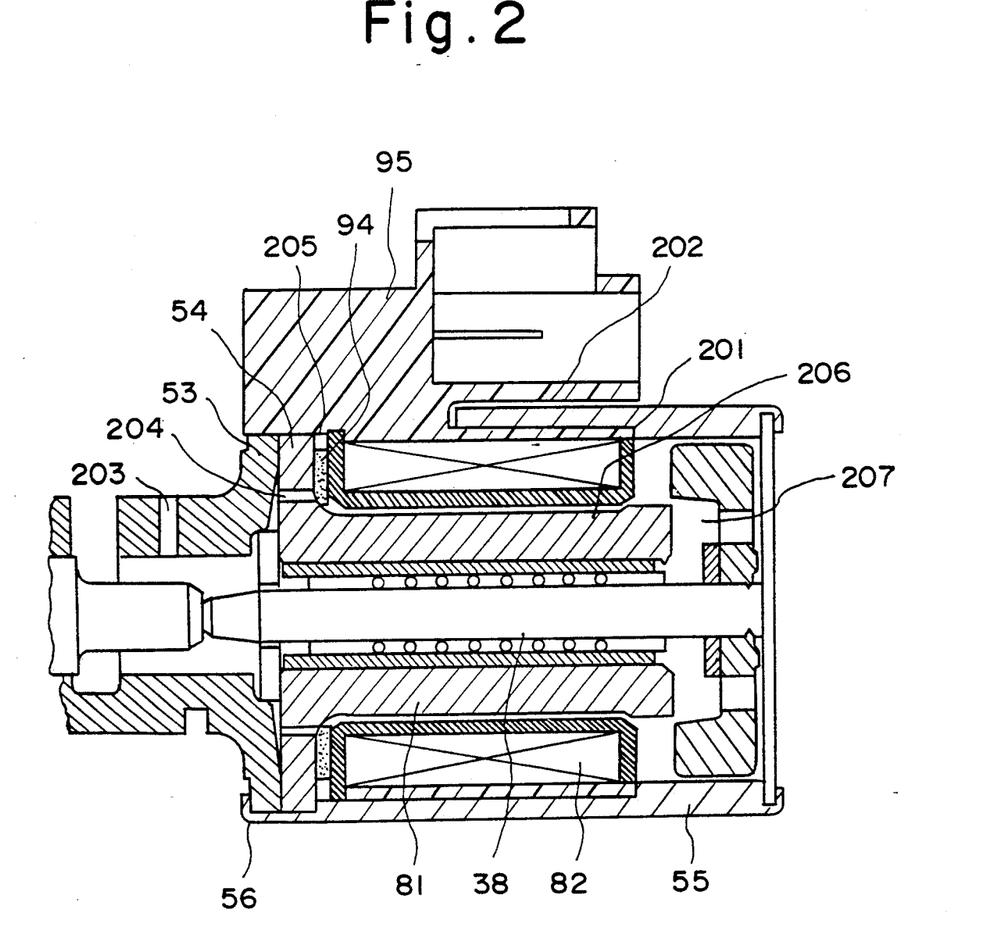
FIG. 2 is a vertical cross sectional view which illustrates an essential portion of an electromagnet portion.

In the hollow portion 83 in the core 81 there is provided a linear type rolling bearing 86 disposed via a sleeve 85. As shown in FIG. 2, after the sleeve 85 has been inserted into the hollow portion 83 of the core 81, three circumferential portions at an end surface of the core 81 are deformed by staking, and a stopper 87 capable of stopping the sleeve 85 is formed.

The linear type ball bearing assembly 86 accommodated in the sleeve 85 is able to move freely within the space in the sleeve 85 with restricted by the stoppers 88 and 89. The linear type ball bearing assembly 86 is constituted by a brass bearing cage 90 and balls 91 accommodated in a through hole formed in the bearing cage 90, the balls 91 being arranged to slightly project over both the outer and inner surfaces of the bearing 86. The push rod 38 is supported via the thus-disposed balls 91 so that the relative rotation between the push rod 38 and the sleeve 85 is enabled.

The push rod 38 is made of a non-magnetic material, for example, stainless steel having a nitrided surface forming a nitrided layer revealing wear resistance. The plunger 84 is secured to an end portion of the push rod 38 as designated by reference numeral 92 by way of ring staking. Another end portion of the push rod 38 has a tapered portion 93 formed in its portion confronting the column portion 37 of the spool valve 5 so that the ring staking with the plunger 84 cannot be conducted if the assembling is conducted erroneously. As a result, any erroneous assembling can be prevented.

A ring 94 made of unwoven fabric is inserted between the end surface of the coil assembly 82 and the flange portion 54 of the core 81 so as to serve as a filter capable of removing foreign matter in oil.

A connector 95 capable of supplying electricity to the electromagnet portion 3 is secured on the outer surface of the case 55.

The plunger 84 has an oil-passage hole 96 in the form of a through hole. As a result, although oil enclosed in the electromagnet portion 3 for the purpose of preventing hydraulic pressure vibrations at high temperature acts as a resistance when the plunger 84 is moved, oil can be freely passes through the oil passage hole 96 thus formed, causing the resistance to be reduced.

A cover member 97 closes an end portion of the case 55 adjacent to the plunger 84.

When the electromagnet portion 3 is assembled, the core 81 to which the ring 94 and the coil assembly 82 are attached is inserted into the case 55 from an end of it and the flange portion 54 of the core 81 is positioned and secured by using the stepped portion 57 formed on an end of the inner surface of the case 55 so that a stationary portion is formed.

On the other hand, the plunger 84 is fitted at another end of the push rod 38 before being secured by ring staking so that a movable portion is formed. Then, the stopper 89 is inserted, and an end portion of the push rod 38 is inserted from another end of the case 55 constituting the movable portion at the portion corresponding to the position of the movable portion so as to be accommodated in the linear type ball bearing assembly 86 via the sleeve 85.

Then, the flange portion 53 formed at another end of the valve sleeve 4 of the pressure governing valve portion 2 and the stopper 88 are inserted into the case 55 at an end portion of the electromagnet portion 3. Then, the end portion 56 of the case 55 is staked on the outer surface of the flange portion 53 of the valve sleeve 4. As a result, the pressure control valve 1 is assembled.

As a result of the structure according to the present invention constituted as described above, when hydraulic oil is supplied to the supply port 21 of the valve sleeve 4 from a pump or the like, the hydraulic pressure oil from the supply port 21 then reaches the land portions 31 and 32 formed on the surface of the spool valve 5 via an opening formed between the valve sleeve 4 and the land portion 31 formed on the surface of the spool valve 5. Then, the hydraulic pressure oil passes through the output port 22 of the valve sleeve 4 always connecting the two land portions 31 and 32 before being supplied to each hydraulic pressure apparatuses in the hydraulic pressure system such as an automatic transmission.

Pressure P of the hydraulic pressure oil outputted through the output port 22 is simultaneously fed back via the feedback oil passage 36. Pressure P is transmitted to the closed space 35 formed by the land portion 31, the small-diameter land portion 33 which is formed next to the land portion 31, and the valve sleeve 4 so that it is applied to the land portion 31 and the small-diameter land portion 33. As a result, an output pressure feedback load is generated which corresponding to the area difference A1 −A2 given by subtracting cross sectional area A2 of the small-diameter land portion 33 from cross sectional area A1 of the land portion 31.

The output pressure feedback load (A1−A2)P is added to force FSP which is the urging force caused by the spring 6. Thus, the spool valve 5 is pressed to right when viewed in the drawing with synthesized force (A1−A2)P+FSP. As a result, the spool valve 5 moves to displace its position in the valve sleeve 4 to the position at which the above-described synthesized force balances with force FSOL generated by the electromagnet portion 3.

As a result of the movement of the spool valve 5, the land portions 31 and 32 move so that the supply port 21 and the exhaust port 23 of the valve sleeve 4 are controlled in such a manner that they are opened/closed at a predetermined rate with respect to the output port 22. As a result, control is so conducted that output pressure P at the output port 22 holds the following equation in response to an electromagnetic signal inputted to the electromagnet portion 3:

$$P=(FSOL-FSP)/(A1-A2)$$

Then, the internal portion of the electromagnet valve portion will be described with reference to FIG. 2.

The electromagnet portion 3 is filled with hydraulic oil for the hydraulic pressure control system for the purpose of preventing hydraulic pressure vibrations caused at high temperature. Therefore, foreign matter such as iron dust or the like in the oil tank can enter the electromagnet portion 3. In order to prevent this, the ring 94 made of unwoven fabric is interposed between the confronting two end surfaces of the flange portion 54 of the core 81 and the coil assembly 82. The unwoven fabric constituting the ring 94 is made of heat-resisting nylon having a liquid permeability sufficient to separate and filter foreign matter from hydraulic oil when it passes through the ring 94.

The case 55 surrounding the electromagnet portion 3 has a stepped portion 201 formed in its inner surface, the stepped portion 201 being arranged to be brought into contact with another end portion of the coil assembly 82. The stepped portion 201 is provided for the purpose of pressing the end portion of the coil assembly 2 when the pressure governing valve portion 2 and the electromagnet portion 3 are assembled by staking the end portion 56 of the case 55. As a result of the pressure thus applied to the end portion of the coil assembly 82, the ring 94 is compressed between the flange portion 54 of the core 81 and the coil assembly 82.

Thus, looseness between the coil assembly 82 and the core 81 can be prevented by the pressure thus effected by the stepped portion 201 and the elasticity of the ring 94.

Since the structure is arranged as described above, hydraulic oil in the oil tank (omitted from illustration) which tries to enter the electromagnet portion 3 through a gap 202 or the like formed between the connector 95 and the case 55 can be blocked by the pressure at the stepped portion 201. Furthermore, hydraulic oil which enters the electromagnet portion 3 via oil passage holes 203 and 204 and hydraulic oil which enters the same through a gap 205 formed between the connector 95 and the case 55 can be filtered when they pass through the above-described ring 94 before reaching an oil chamber 207 via an annular oil passage 206.

Figure 3:
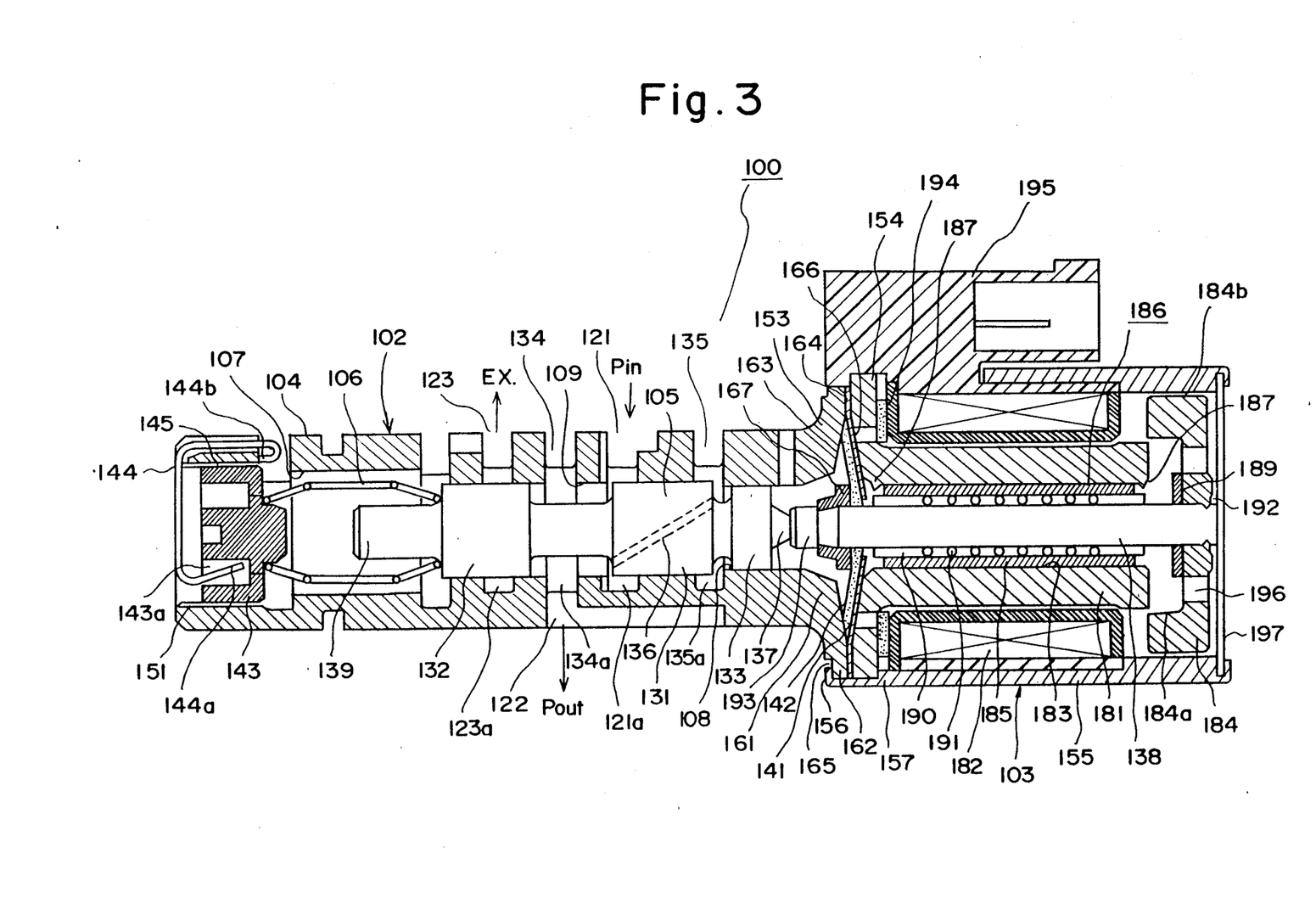
FIG. 3 is a cross sectional view which illustrates another embodiment of the pressure control valve according to the present invention.

Then, a cross section of the pressure control valve according to another embodiment of the present invention is shown in FIG. 3.

Referring to the drawing, reference numeral 100 represents a pressure control valve comprises a pressure governing valve portion 102 and an electromagnet portion 103 similarly to the first embodiment. The pressure governing valve portion 102 is constituted by a valve sleeve 104 and a spool valve 105.

Referring to FIG. 3 which illustrates the pressure control valve 100, reference numeral 106 represents a spring, 107 represents a large-diameter hole capable of accommodating the spring 106, 108 represents a small-diameter guide hole, and 109 represents an intermediate-diameter guide hole. Reference numeral 121 represents a supply port, 122 represents an output port, and 123 represents an exhaust port. The port portions in the valve sleeve 104 have annular cutouts 121a, 123a, 134a, and 135a.

The spool valve 105 comprises two land portions 131 and 132 having the same diameter and a small-diameter land portion 133 so that they form a space 134 and a closed space 135 in cooperation with the valve sleeve 104. A feedback oil passage 136 is formed in the land portion 131. Reference numeral 137 represents a projection portion, 138 represents a push rod, and 139 represents a column portion. Reference numerals 141, 187, and 189 represent stoppers.

The spring 106 is adjusted by driving a male screw member 143 into a female screw member 151. Reference numeral 143a represents a fastening hole, 144 represents a fitting pin, 144a represents a lower end portion of the fitting pin 144, and 145 represents a hole.

Reference numerals 153 and 154 represent flange portions of the valve sleeve 104 and the electromagnet portion 103, respectively. The two flange portions 153 and 154 are coupled to each other by staking an end portion 156 of the case 155. Reference numeral 157 represents a stepped portion, 161 represents a thick wall portion, 162 represents a thin wall portion, 163 and 166 represent tapered portions, 164 represents a periphery portion, and 165 represents an annularly stepped portion.

The electromagnet portion 103 comprises: a stationary portion constituted by a cylindrical core 181 and a coil assembly 182; and a movable portion constituted by a plunger 184 and a push rod 138. In the core 181, reference numeral 183 represents a hollow portion, 184a represents a recessed portion, 184b represents an outer surface, 185 represents a sleeve, 186 represents a linear type ball bearing assembly 190 represents a bearing cage, 191 represents balls accommodated in the bearing cage 190, 193 represents a contact portion, 194 represents a ring made of unwoven fabric, 195 represents a connector, 196 represents an oil passage hole, and 197 represents a cover member.

The difference from the above-described first embodiment lies in the structure of the spool valve 105, the same of the valve sleeve 104 in the pressure governing valve portion 102, and in the structure coupling the pressure governing valve portion 102 and the electromagnet portion 103.

That is, the valve sleeve 104 has a large-diameter hole 107 capable of accommodating the spring 106, and, next to the hole 107, a small-diameter guide hole 108 capable of guiding the spool valve 105 by sliding it, and an intermediate-diameter guide hole 109 formed on its inner surface in the axial direction in the form of through holes.

A supply port 121 facing a radial direction, an output port 122, and an exhaust port 123 are successively formed in the sequential order described above from right to left when viewed in the drawing upon the outer surface of the valve sleeve 104 at a position which corresponds to the above-described guide hole 109. In order to make the flow of oil smooth at each of the ports, annular cutout portions 121a, 123a, 134a, and 135a are, if necessary, formed.

The spool valve 105 has two land portions 131 and 132 having the same diameter and are intimately guided by being slid into the above-described intermediate-diameter guide hole 109, the spool valve 105 further having a small-diameter land portion 133 formed next to the land portion 131 and is intimately guided into the small-diameter guide hole 108 by being slid. The distance between the two land portions 131 and 132 having the same diameter is determined so as to enable the output port 122 to alternately communicate with the supply port 121 and the exhaust port 123 at a predetermined ratio by the slide of the spool valve 105. A space 134 formed between the land portions 131 and 132 is always connected to the output port 122.

A closed space 135 formed by the land portion 131, the small-diameter land portion 133, and the guide holes 108 and 109 is connected to the space 134 formed between the land portions 131 and 132 by a feedback oil passage 136. The feedback oil passage 136 is arranged to diagonally penetrates the land portion 131 so that output pressure obtained at the output port 122 is fed back to the closed space 135.

The projecting portion 137 projecting over the central portion of the end surface of the small-diameter land portion 133 is arranged to be brought into contact with the push rod 138 of the electromagnet portion 103 to be described later, while a column portion 139 projecting over the central portion of the end surface of the land portion 132 serves as a member for restricting the stroke of the spool valve 105 as well serving as a guide for the spring 106.

In order to apply a load to the spring 106, the hole 145 formed in the valve sleeve 104 has a female screw member 151 formed thereon, and a male screw member 143 which is adapted to be screwed with the female screw member 151 is inserted therein. As a result, the spring 106 can be abutted against the end surface of the spool valve 105 by introducing the male screw member 143 into the hole 145 with being rotated. Furthermore, the compression degree of the spring 106 can be varied by adjusting the angular degree of the rotation of the male screw member 143.

When the pressure governing valve portion 102 is assembled, first the spool valve 105 is, from left, inserted into the guide hole 108 formed in the valve sleeve 104 with the small-diameter land portion 133 positioned at an end portion of the hole 108. On the other hand, the spring 106 is inserted from the hole 145 so as to surround the column portion 139 and to come contact with the end surface of the land portion 132. Thus, the spring 106 is compressed by a predetermined degree by screwing the male screw member 143 into the female screw member 151 formed in the valve sleeve 104 under condition that the spring 106 is retained.

The joint portion between the pressure governing valve portion 102 and the electromagnet portion 103 is constituted in such a manner that the linear type ball bearing assembly 186 accommodated in the sleeve 185 of the electromagnet 103 is able to move freely within the space in the sleeve 185 with restricted by the stopper 141 comprising a belleville spring disposed at the left end portion of the push rod 138 and a brass stopper 189 disposed adjacent to the plunger 184. A member 142 made of unwoven fabric is provided for the stopper 141 at a position adjacent to the pressure governing valve potion 102. The unwoven fabric member 142 is, similarly to the above-described ring 194 according to the first embodiment, made of nylon having heat resistance, and is secured by a stopper ring 167.

According to the above-described first embodiment, the tapered portion 63 is formed only on the flange portion 53 of the valve sleeve 4. However, according to this embodiment, another tapered portion 166 is formed on the flange portion 154 of the core 181.

As a result of the structure according to this embodiment constituted as described above, when pressurized fluid such as hydraulic pressure oil is supplied to the supply port 121 of the valve sleeve 104 from a pump or the like, the hydraulic pressure oil from the supply port 121 then reaches a space 134 formed between the land portions 131 and 132 of the spool valve 105 after it has passed through an opening between the valve sleeve 104 and the land portion 131 of the spool valve 105. Then, the hydraulic pressure oil passes through the output port 122 of the valve sleeve 104 always connecting the space 134 before being supplied to each hydraulic pressure apparatuses in the hydraulic pressure system such as an automatic transmission.

Pressure P of the hydraulic pressure oil outputted through the output port 122 is simultaneously fed back via the feedback oil passage 136. Pressure P is transmitted to the closed space 135 formed by the land portion 131, the small-diameter land portion 133 which is formed next to the land portion 131, and the valve sleeve 104 so that an output pressure feedback load is generated by a degree which corresponding to the area difference A1−A2 given by subtracting cross sectional area A2 of the small-diameter land portion 133 from cross sectional area A1 of the land portion 131.

The thus generated output pressure feedback load (A1−A2)P is added to force Fsol which is generated by the electromagnet portion 103. Thus, the spool valve 105 is pressed to left when viewed in the drawing with synthesized force (A1−A2)P+FSOL. As a result, the spool valve 105 moves to displace its position in the valve sleeve 104 to the position at which the above-described synthesized force balances with force FSP which is the urging force from the spring 106.

As a result of the movement of the spool valve 105, the land portions 131 and 132 move so that the supply port 121 and the exhaust port 123 of the valve sleeve 104 are controlled in such a manner that they are opened/closed at a predetermined rate with respect to the output port 122. As a result, control is so conducted that output pressure P at the output port 122 holds the following equation in response to an electromagnetic signal inputted to the electromagnet portion 103:

$$P = (FSP - FSOL)/(A1 - A2)$$

As many apparently widely different embodiments of this invention may be made without departing from the spirit and scope thereof, it is to be understood that the invention is not limited to the specific embodiments thereof except as defined in the appended claims.

What we claim is:

1. A pressure control valve comprising:
   (a) a valve sleeve having a supply port, an output port, an exhaust port and a flange portion formed at one end thereof;
   (b) a spool valve slidably mounted in said valve sleeve;
   (c) a spring biasing said spool valve axially in a first direction;
   (d) a push rod axially aligned with and having a first end bearing against said spool valve;
   (e) an electromagnet, for driving said push rod and said spool valve axially, in a second direction, opposite said first direction, said electromagnet comprising:
      (i) a core having an axial bore for receiving said push rod and a flange portion formed at one end, said flange portion of said core having an outer surface thereof opposing the outer surface of said flange portion of said valve sleeve, at least one of said flange portions having a radial taper on its opposing surface so that the opposing, outer surfaces are in contact only in a peripheral region of the opposing, outer surfaces;
      (ii) a ball bearing assembly within said axial bore surrounding and slidably supporting said push rod;
      (iii) a coil assembly disposed around said core;
      (iv) a plunger mounted on a second end of said push rod, said plunger having a recess defining an interior cylindrical surface and receiving the end of said core opposite said one end of said core;
      (v) a case containing said core, said coil assembly and said push rod, said case having a circumferential shoulder on its inner surface for mating with and positioning said flange portion of said core to axially align said push rod with said spool valve and to maintain said recess of said plunger concentric with said core and thereby maintain a small peripheral clearance between the interior cylindrical surface of said plunger and said core; and
      (vi) a ring made of unwoven fabric interposed between an end of said flange portion of said core and an end of said coil assembly.

2. A pressure control valve according to claim 1, wherein said one flange portion has a readily inward wall portion and a peripheral wall portion integral with and thinner than said radially inward wall portion.

3. A pressure control valve according to claim 1, further comprising feedback means for applying an output pressure feedback load to said spool valve in said second direction.

4. A pressure control valve according to claim 1, wherein said one flange portion is the flange portion of said valve sleeve and further comprising an annular step cut into the periphery of said valve sleeve flange portion at the surface opposite its abutting surface.

5. A pressure control valve according to claim 1 wherein means for limiting the extent of axial movement of said ball bearing assembly is interposed between said opposing surfaces of said flange portions.

6. A pressure control valve comprising:
   (a) a valve sleeve having a supply port, an output port, an exhaust port and a flange portion formed at one end thereof;
   (b) a spool valve slidably mounted in said valve sleeve;
   (c) a spring biasing said spool valve axially in a first direction;
   (d) a push rod axially aligned with and having a first end bearing against said spool valve;
   (e) an electromagnet, for driving said push rod and said spool valve axially, in a second direction, opposite said first direction, said electromagnet comprising:
      (i) a core having an axial bore for receiving said push rod and a flange portion formed at one end, said flange portion of said core having an outer surface thereof opposing the outer surface of said flange portion of said valve sleeve, said flange portion of said valve sleeve having (a) a radial taper on its opposing surface so that the opposing, outer surfaces are in contact only in a peripheral region of the opposing, outer surfaces and (b) an annular step cut into the periphery of said valve sleeve flange portion at the surface opposite its opposing surface;

(ii) a ball bearing assembly within said axial bore surrounding and slidably supporting said push rod;
(iii) a coil assembly disposed around said core;
(iv) a plunger mounted on a second end of said push rod, said plunger having a recess defining an interior cylindrical surface and receiving the end of said core opposite said one end of said core;
(v) a case containing said core, said coil assembly and said push rod, said case having a circumferential shoulder on its inner surface for mating with and positioning said flange portion of said core to axially align said push rod with said spool valve and to maintain said recess of said plunger concentric with said core and thereby maintain a small peripheral clearance between the interior cylindrical surface of said plunger and said core.

7. A pressure control valve in accordance with claim 6, wherein said radial taper has been cut into said radially inward wall portion.

8. A pressure control valve comprising:
(a) a valve sleeve having a supply port, an output port, an exhaust port and a flange portion formed at one end thereof;
(b) a spool valve slidably mounted in said valve sleeve;
(c) a spring biasing said spool valve axially in a first direction;
(d) a push rod axially aligned with and having a first end bearing against said spool valve;
(e) an electromagnet, for driving said push rod and said spool valve axially, in a second direction, opposite said first direction, said electromagnet comprising:
(i) a core having an axial bore for receiving said push rod and a flange portion formed at one end, said flange portion of said core having an outer surface thereof opposing the outer surface of said flange portion of said valve sleeve, at least one of said flange portions having a radial taper on its opposing surface so that the opposing, outer surfaces are in contact only in a peripheral region of the opposing, outer surfaces, said one flange portion having a radially inward wall portion and a peripheral wall portion integral with and thinner than said radially inward wall portion;
(ii) a ball bearing assembly within said axial bore surrounding and slidably supporting said push rod;
(iii) a coil assembly disposed around said core;
(iv) a plunger mounted on a second end of said push rod, said plunger having a recess defining an interior cylindrical surface and receiving the end of said core opposite said one end of said core;
(v) a case containing said core, said coil assembly and said push rod, said case having a circumferential shoulder on its inner surface for mating with and positioning said flange portion of said core to axially align said push rod with said spool valve and to maintain said recess of said plunger concentric with said core and thereby maintain a small peripheral clearance between the interior cylindrical surface of said plunger and said core.

9. A pressure control valve according to claim 6, wherein said case has an annular recess formed on the interior end portion of said case and defining said shoulder, said annular recess receiving and holding said flange portion of said core and said cut periphery of said valve sleeve flange portion.

10. A pressure control valve comprising:
(a) a valve sleeve having a supply port, an output port, an exhaust port and a flange portion formed at one end;
(b) a spool valve slidably mounted in said valve sleeve;
(c) a spring biasing said spool valve axially in a first direction;
(d) a push rod axially aligned with and having a first end bearing against said spool valve;
(e) an electromagnet, for driving said push rod and said spool valve axially, in a second direction, opposite said first direction, said electromagnet comprising:
(i) a core having an axial bore for receiving said push rod and a flange portion formed at one end, said flange portion of said core having an outer surface thereof opposing the outer surface off said flange portion of said valve sleeve, at least one of said flange portions having a radial taper on its opposing surface so that the opposing, outer surfaces are in contact only in a peripheral region of the opposing, outer surfaces;
(ii) a ball bearing assembly within said axial bore surrounding and slidably supporting said push rod;
(iii) a coil assembly disposed around said core;
(iv) a plunger mounted on a second end of said push rod, said plunger having a recess defining an interior cylindrical surface and receiving the end of said core opposite said one end of said core;
(v) a case containing said core, said coil assembly and said push rod, said case having a circumferential shoulder on its inner surface for mating with and positioning said flange portion of said core to axially align said push rod with said spool valve and to maintain said recess of said plunger concentric with said case and thereby maintain a small peripheral clearance between the interior cylindrical surface of said plunger and said core; and
(vi) means for limiting the extent of axial movement of said ball bearing assembly interposed between said opposing surfaces of said flange portions.

* * * * *

UNITED STATES PATENT AND TRADEMARK OFFICE
CERTIFICATE OF CORRECTION

PATENT NO. : 5,259,414
DATED : November 9, 1993
INVENTOR(S) : SUZUKI et al

It is certified that error appears in the above-indentified patent and that said Letters Patent is hereby corrected as shown below:

Col. 1, line 21, "pot" should read --port--.

Col. 2, line 43, "first" should read --further--.

Col. 12, line 26, "readily" should be --radially--.

Col. 13, line 20, delete "6" and insert --8--.

Col. 14, line 30, delete "off" and insert --of--.

Signed and Sealed this

Ninth Day of August, 1994

Attest:

BRUCE LEHMAN

Attesting Officer

Commissioner of Patents and Trademarks